United States Patent
Sivaswamy et al.

(10) Patent No.: US 12,141,482 B2
(45) Date of Patent: Nov. 12, 2024

(54) MAINTAINING DATA IN MEMORY FOR TRANSFORMATION AND QUALITY CHECKING WHEN READING FROM A SOURCE AND LOADING TO A TARGET

(71) Applicant: INTERNATIONAL BUSINESS MACHINES CORPORATION, Armonk, NY (US)

(72) Inventors: Hemant Kumar Sivaswamy, Pune (IN); Pushpender Kumar Garg, Pune (IN); Rohit Jain, Pune (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 61 days.

(21) Appl. No.: 17/482,780

(22) Filed: Sep. 23, 2021

(65) Prior Publication Data
US 2023/0086307 A1    Mar. 23, 2023

(51) Int. Cl.
*G06F 3/06* (2006.01)
*G06F 12/0893* (2016.01)

(52) U.S. Cl.
CPC .......... *G06F 3/0661* (2013.01); *G06F 3/0604* (2013.01); *G06F 3/0659* (2013.01);
(Continued)

(58) Field of Classification Search
CPC .... G06F 3/0661; G06F 3/0604; G06F 3/0659; G06F 3/0673; G06F 12/0893; G06F 2212/1041
See application file for complete search history.

(56) References Cited

U.S. PATENT DOCUMENTS 9,582,421 B1 *  2/2017  Agarwala ............. G06F 3/0689
10,055,431 B2   8/2018  Marrelli et al.
(Continued)

FOREIGN PATENT DOCUMENTS

CN    109933581 A    6/2019
CN    110659273 A    1/2020

OTHER PUBLICATIONS

Mell, Peter, et al., "The NIST Definition of Cloud Computing", NIST Special Publication 800-145, Sep. 2011, Gaithersburg, MD, 7 pgs.

(Continued)

*Primary Examiner* — Charles Rones
*Assistant Examiner* — Alexander Vinnitsky
(74) *Attorney, Agent, or Firm* — Michael A. Petrocelli, Esq.; Matthew M. Hulihan, Esq.; Heslin Rothenberg Farley & Mesiti P.C.

(57) ABSTRACT

Data transformation and data quality checking is provided by reading data from a source datastore and storing the data into memory, performing in-memory processing of the data stored in memory, where the data is maintained in-memory for performance of the in-memory processing thereof, and where the in-memory processing includes performing one or more transformations on the data stored in memory, in which the data stored in memory is transformed and stored back into the memory and applying one or more data quality rules to the data stored in-memory, and based on performing the in-memory processing of the data stored and maintained in memory for the in-memory processing, loading to a target datastore at least some of the data processed by the in-memory processing.

19 Claims, 8 Drawing Sheets

(52) U.S. Cl.
CPC ........ *G06F 3/0673* (2013.01); *G06F 12/0893* (2013.01); *G06F 2212/1041* (2013.01)

(56) References Cited

U.S. PATENT DOCUMENTS

| | | | | |
|---|---|---|---|---|
| 11,188,062 | B2* | 11/2021 | Kobayashi | G05B 19/4184 |
| 11,314,572 | B1* | 4/2022 | Avner | G06F 11/0772 |
| 2003/0097531 | A1* | 5/2003 | Arimilli | G06F 12/0831 |
| | | | | 711/146 |
| 2004/0039880 | A1* | 2/2004 | Pentkovski | G06F 12/0811 |
| | | | | 711/146 |
| 2006/0005074 | A1* | 1/2006 | Yanai | G06F 11/2066 |
| | | | | 714/6.32 |
| 2009/0119674 | A1* | 5/2009 | Eberhard | G06F 9/541 |
| | | | | 719/310 |
| 2017/0075966 | A1* | 3/2017 | Greene | G06F 16/254 |
| 2017/0316068 | A1* | 11/2017 | Greene | G06F 16/252 |
| 2021/0240672 | A1* | 8/2021 | Dillon | G06F 16/156 |
| 2022/0278720 | A1* | 9/2022 | Raam | H01Q 1/38 |

OTHER PUBLICATIONS

Rodic, J., et al., "Generating Data Quality Rules and Integration into ETL Process", DOLAP 2009, ACM 12th International Workshop on Data Warehousing and OLAP, Jan. 2009, pp. 65-72.

"Data Quality Implementation using Pentaho Data Integration (PDI)", Gray Matter, pp. 1-20.

"IBM BigQuality", retrieved on Apr. 9, 2021 from Internet URL: <https://www.ibm.com/products/bigquality>, 8 pgs.

Anonymous, "Systems and Methods to Monitor Data Quality Issues Through a Rule Based Approach", IPCOM000241094D, Mar. 26, 2015, 12 pgs.

\* cited by examiner

MAINTAINING DATA IN MEMORY FOR TRANSFORMATION AND QUALITY CHECKING WHEN READING FROM A SOURCE AND LOADING TO A TARGET

BACKGROUND

Distributed computing frameworks are widely adopted data processing facilities for processing big data across domains. Complex business logic can be implemented using these frameworks across data pipelines that include many layers. As part of this processing, it may be desired to extract data from a source and load it to a target. It may be desired to apply various transformations to the source data as part of this. Meanwhile, it is important to maintain quality by applying various data quality rules to the data to ensure data quality.

SUMMARY

Shortcomings of the prior art are overcome and additional advantages are provided through the provision of a computer-implemented method. The method reads data from a source datastore and stores the data into memory. The method also performs in-memory processing of the data stored in memory. The data is maintained in memory for performance of the in-memory processing thereof. The in-memory processing includes performing transformation(s) on the data stored in memory, in which the data stored in memory is transformed and stored back into the memory. The in-memory processing also includes applying data quality rule(s) to the data stored in memory. The method additional includes, based on performing the in-memory processing of the data stored and maintained in memory for the in-memory processing, loading to a target datastore at least some of the data processed by the in-memory processing.

Further, a computer system is provided that includes a memory and a processor in communication with the memory, wherein the computer system is configured to perform a method. The method reads data from a source datastore and stores the data into memory. The method also performs in-memory processing of the data stored in memory. The data is maintained in memory for performance of the in-memory processing thereof. The in-memory processing includes performing transformation(s) on the data stored in memory, in which the data stored in memory is transformed and stored back into the memory. The in-memory processing also includes applying data quality rule(s) to the data stored in memory. The method additional includes, based on performing the in-memory processing of the data stored and maintained in memory for the in-memory processing, loading to a target datastore at least some of the data processed by the in-memory processing.

Yet further, a computer program product including a computer readable storage medium readable by a processing circuit and storing instructions for execution by the processing circuit is provided for performing a method. The method reads data from a source datastore and stores the data into memory. The method also performs in-memory processing of the data stored in memory. The data is maintained in memory for performance of the in-memory processing thereof. The in-memory processing includes performing transformation(s) on the data stored in memory, in which the data stored in memory is transformed and stored back into the memory. The in-memory processing also includes applying data quality rule(s) to the data stored in memory. The method additional includes, based on performing the in-memory processing of the data stored and maintained in memory for the in-memory processing, loading to a target datastore at least some of the data processed by the in-memory processing.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the disclosure are apparent from the following detailed description taken in conjunction with the accompanying drawings in which:

DETAILED DESCRIPTION

Figure 1:
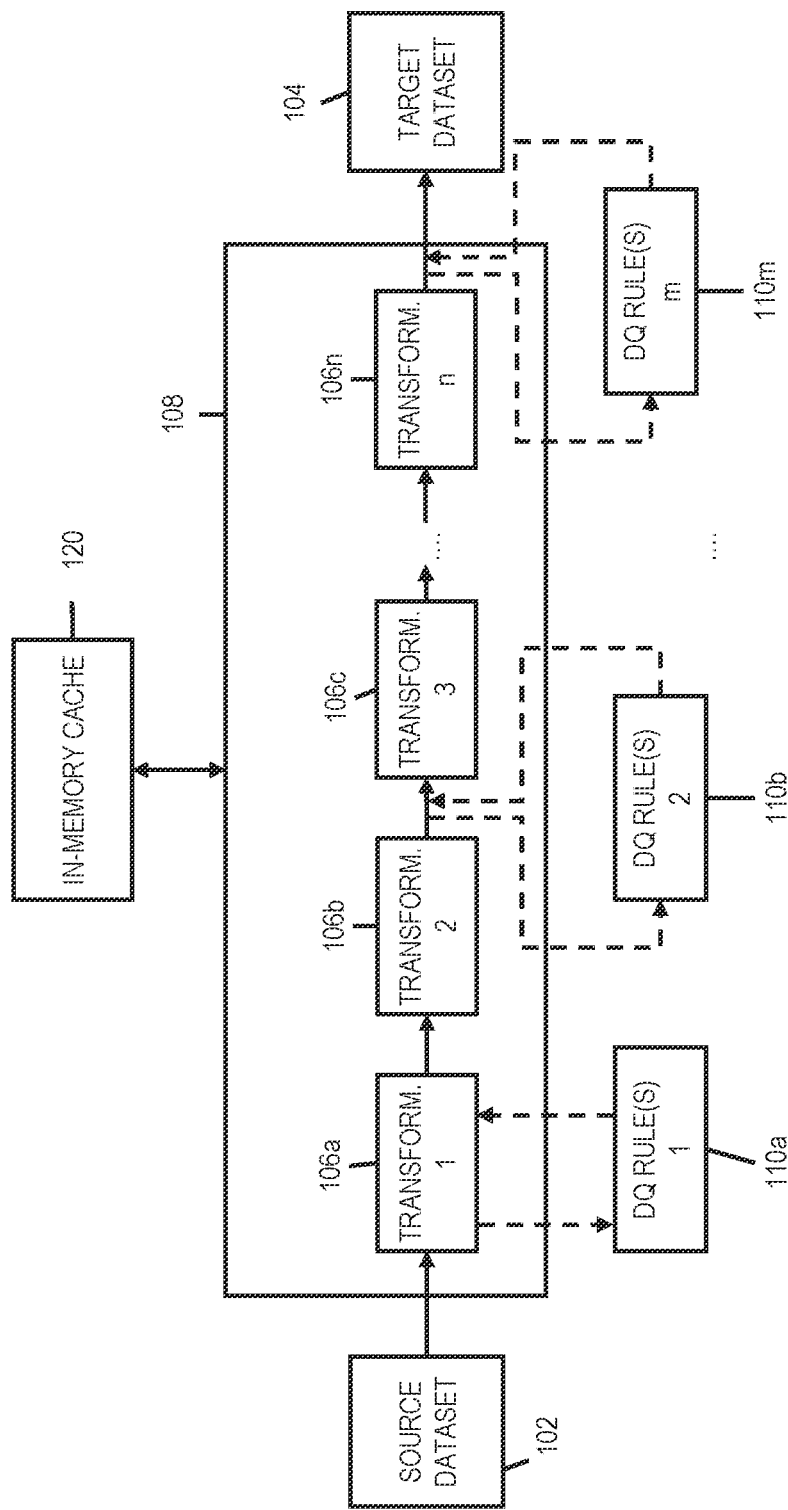
FIG. 1 depicts an example conceptual diagram of in-memory data transformation and data quality rule application, in accordance with aspects described herein.

Described herein are approaches for data transformation and quality checking of data extracted from a source datastore for loading to a target datastore. The data transformation and quality checking are performed as part of in-memory processing of the data, i.e., while the data is maintained in memory after extracting it from the source but before writing it (even if temporarily during or after transformation(s)) to the target datastore.

As noted, distributed computing frameworks are popular for processing big data and can handle high-complexity tasks, but frameworks/tools currently available for transformation and data quality (DQ) have drawbacks. When both transformations and data quality assessments are to be performed, conventional practices might utilize two reads and writes: the computing framework performs a read operation to read the data from the source datastore ("source"), performs transformation(s) on the read data, performs a write of the transformed data to the target datastore ("target"), performs another read of the transformed data from the target, applies the DQ rule(s) after this second read, and performs a second write to the target once again after the DQ rules have been applied.

However, it may be desired to avoid multiple read/write operations when performing a job to extract data from a source and load it to a target. Thus, in accordance with aspects described herein, DQ rules can be applied against data while it is in-memory and before any initial write to the target. This would avoid the second read/write operation that would otherwise be required to extract the data again after transformation in order to apply the DQ rules. Reads and writes to disk are generally considered costly operations and so avoiding a read/write can help accelerate the overall data pipeline, and particularly so when dealing with relatively large volumes of data to transfer. When transformation and data quality checking are implemented as separate jobs with a read-from-disk between them, this becomes a bottleneck.

This also implicates separation of cross-cutting concerns between the transformation logic and the data quality logic. Complex transformation business logic performed by a distributed computing framework is typically implemented by developers in dataflow jobs/scripts using application programming interfaces (APIs). Data quality analysis, however, is a different domain typically managed by data stewards. Business transformation logic can change independent of DQ rules/logic and vice-versa.

In an approach that includes both transformation and DQ rule checking logic in a same codebase, this substantially increases the complexity of the codebase making it more cumbersome to maintain the codebase and more prone to deviating from the best-practice in software engineering to separate cross-cutting concerns. In other words, expressing data quality rules as part of the transformation codebase could become problematic.

In accordance with one aspect described herein, an approach handles both data transformation and data-quality checking as part of a single job while extracted data to be transformed and quality-checked remains in memory, and before loading to the target. It accomplishes this while minimizing the complexity of code by keeping transformation logic separate from the DQ rules and rule checking logic, enabling them to be maintained as separate concerns. "In-memory" and "in memory" as used herein refers to the data being within main/working/random access memory, a main memory database, in-memory database, or in-memory cache, such as a processor or other local cache, a distributed in-memory cache (information-centric networking), or hybrid in-memory cache. Such in-memory storage is faster than, and is contrasted with, 'disk'/'on-disk' storage or memory (which would include tape and other media), which is commonly used as source and target datastores for storing source and target databases. Example in-memory databases include main memory databases (MMDBs) or 'memory resident databases' which are systems relying primarily on main memory for computer data storage. In-memory processing refers to processing of data stored in-memory, for instance in an in-memory database.

When there are quality issues with data to be loaded and maintained in a target datastore it is often desired to take corrective action to address the issues. This usually involves updating incorrect data so that what is provided in the target at the end of transformation and quality processing (the 'final' data) meets the required quality parameters. One approach is to apply data quality rules at the target after the data is loaded to it. However, many target architectures used by modern enterprises are deficient in that it is computationally more expensive to identify and update incorrect data after it is loaded into target, for instance because the target is immutable or because updating data (especially large amounts) requires compaction and is very costly. Thus, in accordance with another aspect provided herein, an approach is provided to facilitate manual corrective actions on-the-fly, based on data failures, while holding the data in-memory or temporary storage until the corrective action is applied, after which the data (now correct) can be written to the target.

It may be desired to change a DQ rule based on observing that source data being extracted from the source system has changed or is otherwise not as expected when the job to extract, transform, quality-check, and load the data to a target was started. As an example, source data previously provided as a 10-digit number may have changed to be a 12-digit number. DQ rule(s) written before the change might expect and rely on the source data to be provided in 10-digit form and/or might explicitly check to verify that the incoming data is in 10-digit form. A DQ rule failure in this case might reject in a data rejection is any of the source data is more than 10-digits. A DQ rule(s) update is needed in this instance. However, often the change may not be observed until after commencing a job to extract and transform the data. When the changes are not communicated in time to the stakeholders and/or the DQ rules are not updated, this can result in data quality failures. A similar issue can arise when a new source is integrated into the data pipeline. In either situation, there may be a desire to update one or more DQ rules on-the-fly (e.g. during performance of a job) based on observing the failure. Thus, in accordance with another aspect provided herein, an approach is provided to enable manual changes to DQ rules (for instance rule specification and/or rule parameters) on-the-fly while holding extracted (and possibly transformed) data in-memory or temporary storage until the DQ rule is updated and reapplied.

Accordingly, in example embodiments of aspects described herein, a DQ rules repository enables data stewards to specify both DQ rules and the situations in which those DQ rules are to be applied, i.e., which rules are to apply to data from which data stores (source/target) and the rule attributes or parameters to use depending on the details of the job. The stewards can also create custom rules or chose from predefined rules and possibly tailor them as desired. Then, a data processing job to implement one or more transformations against extracted data from the source implements business logic that can call/hook to DQ rule processing. For instance, instead of transforming data and then writing the transformed data to the target for further processing (such as data quality checking), a process can handover data processing of the data in memory to a data quality engine. The DQ engine can fetch DQ rule(s), for instance those that implement quality standards for the target datastore, from the repository and automatically apply the rule(s) while the data remains in memory, taking any desired further actions prior to the data is written as a first instance to target datastore. As part of this, it may be determined to cache data to an in-memory cache, for instance when multiple transformation and/o rules may need to be applied to the data. In this regard, while some rules may be applicable on an element-by-element basis that allows for simple transformation, rule application, and writing to the target element-by-element, other rules may be dependent on extraction of a larger portion, or potentially the entirety, of the source dataset and thus require a complete 'pass' on all of the data before the rule can be fully applied. This may be the case with statistical DQ rules that account for the entire dataset, for instance. In such a case, the extracted data could be maintained in an in-memory caching framework. The cache could be a local cache (local to the system holding the extracted data in main memory), a distributed external cache (information-centric networking'), and/or a hybrid cache, as examples. In either situation, the data remains 'in-memory'. In-memory distributed caches currently exist and the latency to perform accesses to full datasets in in-memory cache is much less than writing the data out to the target before accessing that data to apply DQ rule(s) thereto.

Different techniques such as dependency injection and callbacks can be used by the system to inject DQ rule checking at runtime of a transformation job. Such injection provides for data quality rule checking within a same context as the transformations being performed on the data. The DQ rules and checking of data against them is injected during transformation runtime such that the transformation code is running but it need not have any information about what DQ rules to execute or responsibility for any processing related to DQ checking. This enables separation of the DQ rules/checking logic from the transformation logic. In some examples, a hook into the transformation job logic is available and used to hook the data quality rule checking into the data transformation runtime. This is an example of a dependency injection that enables the separation of the transformation logic and the data quality rules/checking logic, with the only necessary integration being the hook into the transform logic.

Callbacks are another vehicle to inject DQ rule checking with transformation processing. Which specific DQ rules invoked by the callback(s) can be specified at runtime. During transformation job development, a callback in the transformation logic can be specified as a placeholder. At runtime the placeholder can be provided as specified logic (e.g., DQ rule(s)). This too provides for separation of concerns in which transformation logic and rule checking logic are specified separately but run within the context of the transformation job against data maintained in-memory.

Also in approaches described herein, data stewards can specify a threshold amount of time during which corrective actions in response to DQ rule failures can be taken. An alert can be generated and provided to the appropriate data steward and/or any other stakeholder on a DQ rule failure. The system can decide whether to retain in-memory/cache the data in question or write it to temporary storage until the corrective action is taken. Within the specified amount of time, a data steward (or other stakeholder) can view feedback/information about the DQ rule failure and correct the data by any desired approach, such as by applying expressions, SQL statements or application programming interface (API) call(s) to correct the data. The corrected data can then be loaded into the target by the system. If no corrective action is taken within the threshold time to address the DQ rule failure, then this can be treated as a DQ failure and a desired next action can be taken, for instance to fail the job, ignore the data failure and skip loading the failed data, or any other actions. A user interface can be provided for manual intervention on DQ rule failures and this can be provided for specifying the corrective actions to take.

Additionally or alternatively on DQ rule failures or at any other desired time during performance of a transformation job, data stewards (or other stakeholders) could change one or more DQ rules or parameters thereof, for instance based on whether there are changed data quality requirements. After rule modification, the modified rules can be applied to data, of the job in progress, that has not already been written out to the target.

DQ checking, and on-the-fly modification thereto can avoid situations in which a target rejects an attempt to load data due to, e.g., improper format, or other reasons related to data quality. DQ rules can implement any kind of quality control, for instance technical controls, business rules, or recognition controls, as examples.

In some examples, aspects apply to data integration scenarios involving data processing and movement of data from source to target sites. Software can extract data of a dataset, such as database, from a source datastore, apply transformation(s) and check data quality, then write-out appropriate data transformed, quality-checked data to a target dataset of a target datastore. Acceptance of data by the target and storage of the data to the target datastore is referred to as a load of the data to the target.

FIG. 1 depicts an example conceptual diagram of in-memory data transformation and data quality rule application, in accordance with aspects described herein. Here, a source dataset 102 in disk storage (a source datastore) is to be extracted and loaded to a target dataset 104 in disk storage (a target datastore). Transformations 106a, 106b, . . . , 106n are to be performed on the extracted source data as part of in-memory processing/job 108 before loading it to the target 104. Additionally, data quality rules 110a, 110b, . . . ,110m are also to be applied. Various example such data pipelines exists, for instance Extract, Transform, Load (ETL) processes or other pipelines for big-data processing. Source 102 and target 104 may be remote from each other, i.e. as separate systems that communicate over communication links (indicated as arrows in FIG. 1). The in-memory processing 108 could be implemented on any system, for instance a same or different system from those which provide the source 102 and target 104. Communication between components of FIG. 1, shown by arrows extending between components of FIG. 1, may occur over any appropriate wireless or wired communication link(s) for communicating data, which communication link(s) can encompass one or more local area network(s) and/or wide area network(s). Thus, in some embodiments, components form and/or communicate via one or more intervening networks over wired and/or wireless communications links.

The transformations 106a, 106b, . . . , 106n are applied serially but there are various points at which processing passes to DQ processing (processing of DQ rules 110a, . . . , 110m) in accordance with aspects described herein. For instance, a hook is installed to hook processing of DQ rule 110a into transformation 106a processing. While the transformation logic (including logic to implement 106a) is independent of the DQ rules processing, execution flows from the hook point within transformation 106a to DQ rule processing of DQ rule 110a and then back to transformation 106a as indicated by the dashed arrows in FIG. 1. This is an example of DQ rule processing during a particular transformation (106a). DQ rule processing can also be invoked between transformations as is the case of DQ rule 110b between transformations 106b and 106c in this example. For instance, the DQ rule 110b is registered as a callback between transformation 106b and 106c to perform when transformation 106b concludes and before transformation DQ rule processing can also be invoked toward the start of the in-memory processing 108 (before the first transformation 106a) or at the end of the in-memory processing 108, as is the case of DQ rule 110m. The in-memory processing 108 is configured to, after executing transformation 106n, yield execution to processing DQ rule 110m. Execution returns to the end of in-memory processing 108, at which point the data is written to the target dataset 104 as a first instance.

The data flowing through the transformations and to which the DQ rules are being applied is maintained in-memory. As part of this, the data might need to be maintained for some amount of time in an in-memory cache 120. Certain rules, such as DQ rule 110m, might need to be applied only after some volume (perhaps all) of the source data has been extracted from the source dataset and processes through transformation 106n. The data might remain in the in-memory cache 120 in this case. Additionally or alternatively, if data fails a DQ rule, it may be maintained in the in-memory cache for a duration of time as explained above in order for a data steward or other user to determine how to address the failure.

In this manner, DQ rule processing is performed during, between, before and/or after transformation(s) are applied to source data and while the source data being extracted, transformed, and quality-checked remains in memory. In some examples the data might flow through the in-memory processing 108 (and DQ rules processing) data element-by-data element, for example row-by-row in which a row of data is extracted from the source 102, the row of data flows through transformations 106a, 106b, . . . , 106n and is subjected to the DQ checking of rules 110a, 110b, 110n, and then the transformed, checked row of data is written-out to the target 104. In this situation, the timing and handling of transformations and the DQ rule checking and timing thereof for a given data element is specific to that particular data element. Thus, the DQ rule checking 110b for one element occurs after transformation 106b of that one element according to the flow, but this might take place before any processing 108 commences with respect to some other data element being processed. In this manner, the transformation/rule checking and sequence thereof depicted as part of 108 need not reflect that of processing the entire dataset at once.

In other examples, however, it might be that some transformation(s) and/or rule checking are performed in aggregate, as explained above. Data might be extracted and transformed in larger portions, perhaps by multiple rows or the entire source dataset to be transformed and written, in which case the in-memory cache may be needed if working memory of the system is unable to accommodate all of the source data at once. In a specific example as described above, some DQ rule(s) might be applied only after all transformations have been applied to all applicable data elements, and that might all occur prior to any load of extracted data to the target.

In a specific embodiment of FIG. 1, a source computer system having/maintaining a source datastore is in communication with a target computer system having a target datastore across one or more computer networks and possibly with intervening computer systems therebetween. A component executing on a system, optionally of the source computer system or another computer system different from the source computer system and that target computer system, is configured to extract data from the source datastore into memory of the system, such as cache memory of the system, which could be a distribute in-memory cache as an example. The system is further configured to perform in-memory processing on the extracted data, which includes transformation(s) and application of DQ rules on the data, all prior to any write of that extracted data (including as the data was extracted from the source, during/after transformation, and before/during quality checking) to the target until after the transformation(s) and quality checks have bene applied and the data is finalized to store into the target. The transformation and quality checking prior to writing to the target datastore can be done on a data element-by-data element basis, or on a more aggregated basis in which multiple data elements, up to the entire dataset, is extracted and processed in this manner prior to any writing of the extracted data (as the data was extracted from the source, during/after transformation, and before/during quality checking) to the target. In either situation, any given piece of extracted data has the necessary transformation(s) and necessary quality check(s) performed thereagainst prior to any write of that that piece of data (as obtained or transformed) to the target.

Any desired actions can be configured and taken on a DQ rule failure. The job as a whole could be failed and/or failed data could be written to some alternative location/storage, as examples. DQ rules typically have some actions defined for pass and fail scenarios. In addition, a data quality processing engine could maintain a fail counter and fail the job if a threshold number of fails is reached during job processing. Until such a failure, failed data/records could be handled as desired, for instance by writing them to the target along with passed data/records, or to an alternate target.

Under approaches described herein, data quality checking is provided without increased complexity of transformation logic because the transformation logic can be developed and maintained independent of the data quality logic as they may developed and implemented in different codebases. This enables transformation developers to code transformation logic without considering data quality processing and rules management activity. Meanwhile, greater efficiencies are gained when operating on larger amounts of data because the transformation and data quality checking occurs as part of in-memory processing without separate reads/writes from/to datastores for transformation and data quality checking. The greater the volume of data elements being read/written twice, the greater latency there is relative to only single read/write of each data element.

Further aspects provide for manual corrective actions to data on-the-fly (during in-memory processing) and/or modification (updating, changing, adding, removing) of data quality rule(s) and/or parameters thereof on-the-fly, while the data is in-memory (encompassing a possible in-memory cache or other temporary storage).

Figure 2:
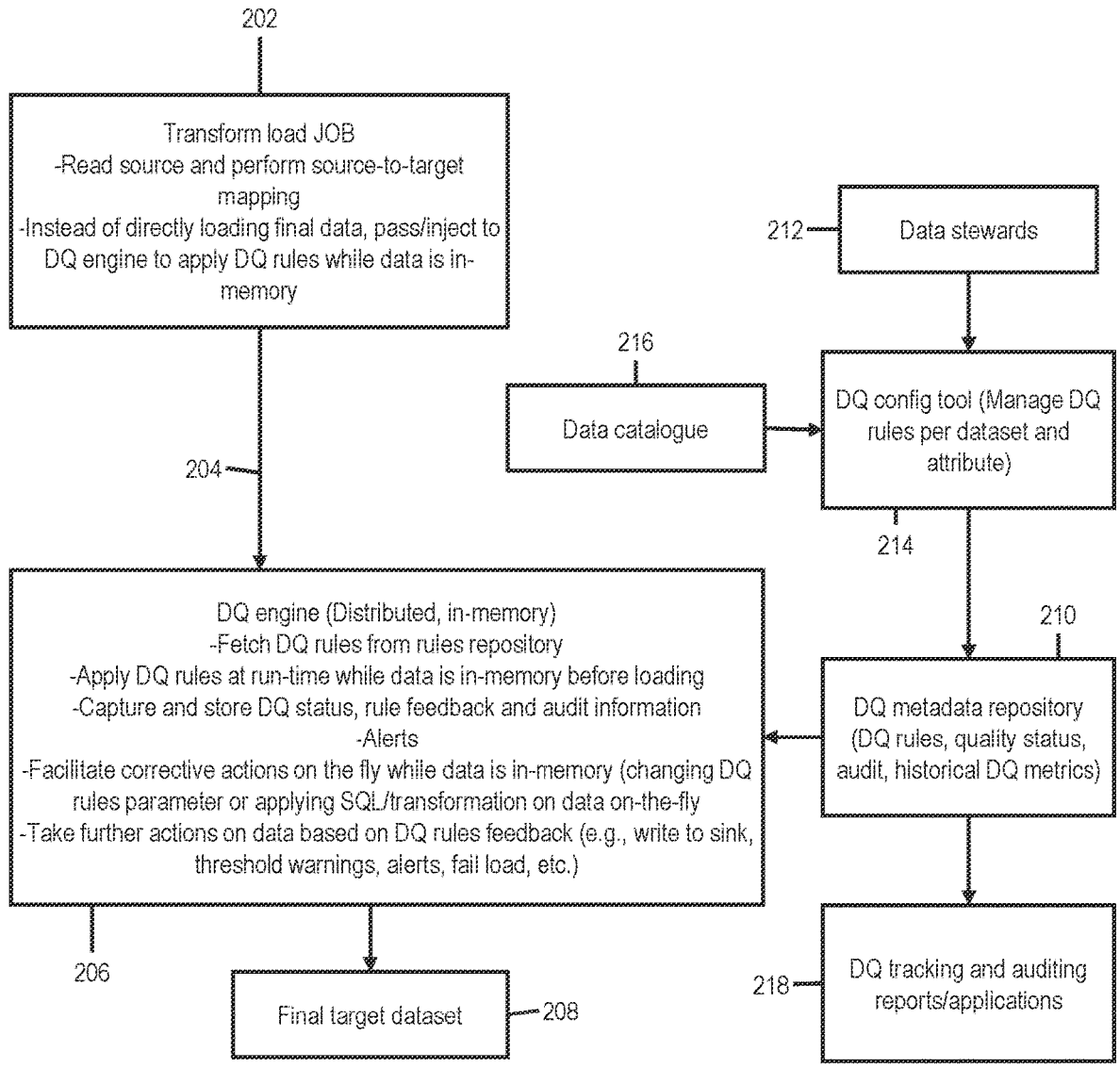
FIGS. 2 and 3 depict example approaches for integration of data quality rule application with a transformation job, in accordance with aspects described herein.
Figure 3:
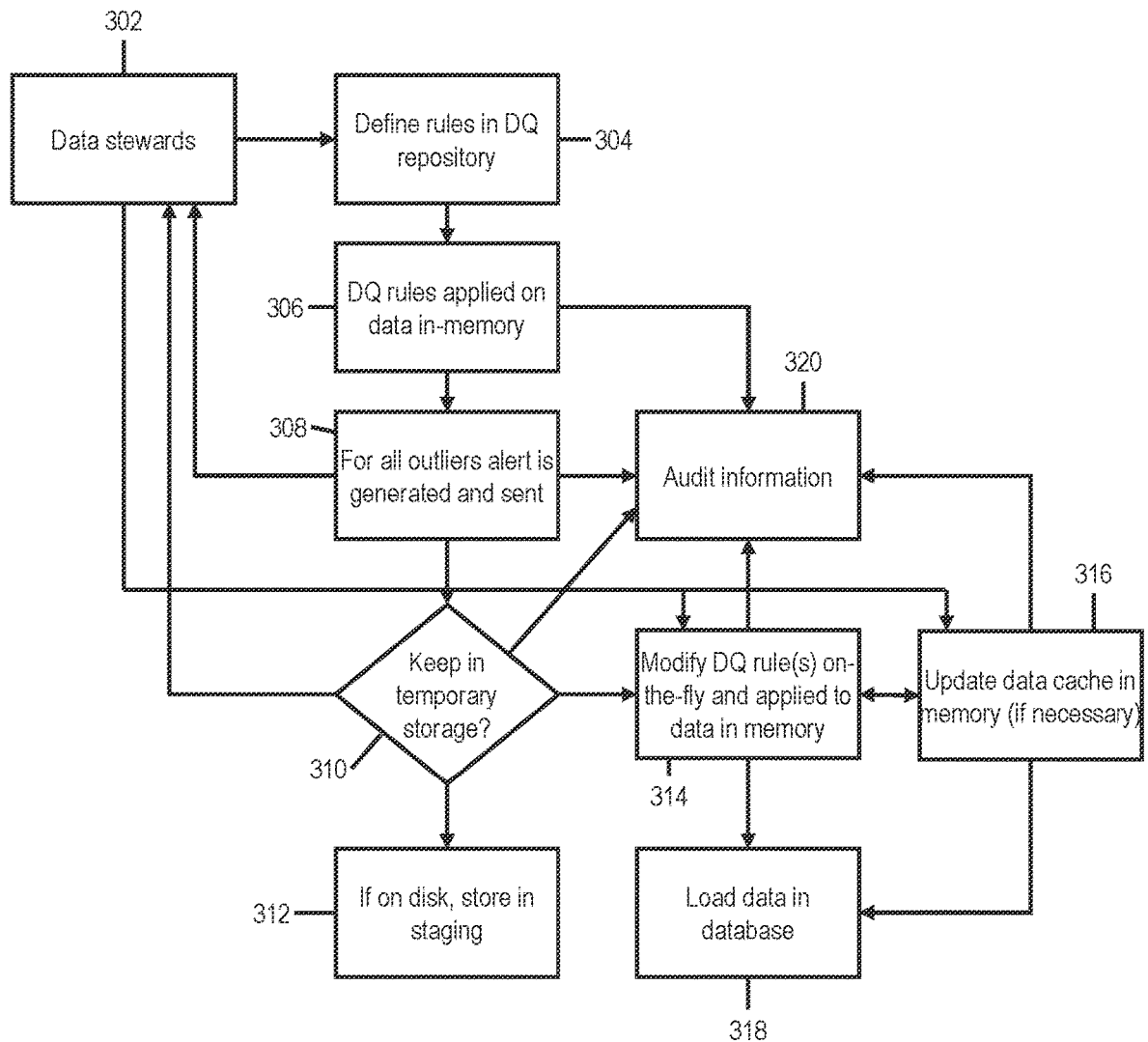

FIGS. 2 and 3 depict example approaches for integration of data quality rule application with a transformation job, in accordance with aspects described herein. With reference to FIG. 2, in-memory processing encompasses a transform load job 202 that reads data of a source dataset from a source datastore and performs source-to-target mapping, referring to one or more transformations on the data. As part of the in-memory processing, call(s) 204 are made to a data quality engine 206, for instance to pass data frames, write options, and a target dataset identifier to the DQ engine 206. The system can run transformation logic for performing the transformations as well as additional logic that hooks the DQ rule processing into the context of the in-memory processing, for instance as dependency injections or callbacks. The DQ engine 206 can execute on a same computer system(s) that perform the in-memory processing or on different computer system(s), and optionally in distributed manner. The DQ rules engine 206 applies the DQ rules. Data that is transformed and quality checked is written/loaded to the final target dataset 208 and the memory that stored the data in-memory can be freed.

The DQ engine fetches DQ rules from a repository 210 housing DQ rules and applies the DQ rules during runtime of the transformation job and while the data resides in-memory, before loading the data to the target (208). As the engine applies the data quality rules, it captures and sends to the repository 210 data quality status (e.g. of the data being transformed), for instance any desired information about the quality of the data for the particular load, as well as audit information and rules feedback. After alerting a data steward or other user about passes/failures, the user might provide feedback that can be stored to the repository 210. Audit information can be any other information to be collected about the data quality processing for the job, for instance information about rule application success and failures.

The DQ engine 206 enables users to take corrective actions with respect to the data and/or DQ rules, on-the-fly while the data is in-memory as explained herein. Examples include changing DQ rule parameters and applying SQL/ transformations on the data on-the-fly during the in-memory processing so that the data can be written (potentially after applying such changes) to the target. The DQ engine 206 also takes any further actions based on the feedback received, for instance to write the data to a sink (target, cache, temporary storage, alternate location, etc.), raise any alerts or warnings, fail the load, etc. These actions can be specified by the DQ rules themselves; often a DQ rule has a validation portion defining criteria for desired data quality and an action portion for specifying action(s) to take based on passing or failing the applicable data quality criteria of the rule.

Data stewards 212 are responsible for data quality and are generally the owners of the data. They have the responsibility of defining DQ rules and ensuring the data they own complies with applicable quality standards. The stewards 212 accomplish this by using a data quality configuration tool 214 to manage the rules and attributes of the rules, which can vary per source/target dataset. The data quality configuration tool 214 pulls dataset metadata from a data catalogue 216, which is a catalogue of the unique datasets and their attributes, for instance—schema and other information about the datasets. The catalogue 216 enables the configuration tool 214 to uniquely identify the data sources and targets and configure the appropriate data quality rules for each of those.

In addition, the data quality metadata repository 210 provides both a rules repository in which data quality rules are maintained and an information store for storing operational, audit, feedback, status, and historical data quality metrics information for a past runs. Another use of the information in the repository 210 is to provide data quality tracking and auditing for reports and/or application (software) 218. Further, aspects can use artificial intelligence (AI)/machine learning models to assist data stewards in creating new rules and modifying existing new rules, for instance recommending rules and attributes thereof, both before and/or during transformation/data quality check processing. A machine learning process can train the models from historical and other information, such as information in a data quality metadata repository. The training can train the models to identify data quality rules and attributes thereof to apply in varying situations with varying types of datasets and properties thereof. A trained ML model can be applied to catalog information about the source/target dataset(s) and optionally other information from the data quality metadata repository and generate configuration recommendations about data quality rule(s) to apply to a given source/target transformation/data quality check job. These configuration recommendations that then be provided to a user (such as a data steward) con configuring the data quality rule(s). These recommendations can be provided before, during, or after job runs. In particular embodiments, the ML model is applied during a job based on/after data quality failures, and the generated recommendations provide recommendations to a user as to how to change data quality rules(s) in response to the data quality failures.

FIG. 3 depicts another example process for integration of data quality rule application with a transformation job, in accordance with aspects described herein. Data stewards 302 define (304) rules in the data quality repository (e.g. 210 of FIG. 2) in which data quality rules are written and managed. The data stewards 302 can create rules, change rule parameters/thresholds, specify actions to take on rule failure/success, etc. Rules can be reusable/mapped for use for data quality checking of data from different datasets, potentially with different attributes being defined for any given rule depending on the dataset(s) involved. Additionally, the data stewards can set other configurations, for instance thresholds for how long data quality engines are to wait for steward/user corrective actions to rules and/or data on failures.

At some point, for instance after applying transformation(s) or related logic and the data being otherwise ready to load to the target, the data is be passed to data quality engine to execute/apply data quality rules (306) as part of a transformation/ingestion job. As part of this, the data quality engine can fetch the appropriate data quality rule(s) from the repository (if not already cached) and apply the rule(s) on the data while it is in memory. The data quality engine is aware of which rule(s) to apply based on the configuration information defined by the data stewards 302 for the particular job being run. The data quality engine can also, as part of its tasks to apply data quality rules, determine whether to maintain the data in a cache or other intermediate in-memory storage to facilitate the efficient application of the desired data quality rules(s).

Applying the DQ rules may indicate 'failures' or 'outliers', referring to data that fails one or more data quality rules being applied. In these situations, alerts can be generated and sent (308) to, e.g., the data stewards 302 and/or any other stakeholders for possible manual action. A decision may be taken by the data stewards 302 in response to failure(s), such as to whether to continue applying the current data quality rules, changing rule(s) and/or data on-the-fly, or perhaps that more time or information is needed to make the decision. The decision can therefore be made to keep data in temporary storage (310), such as an in-memory cache. Optionally, the data could be stored to disk at that point, for instance a staging area (312). If data stewards 302 desire to take any corrective action against the rules or to change data, they can perform that on-the-fly (during the job) while the data remains in-memory (e.g. the cache or other storage). Additionally, or alternatively, another resolution after data quality failure is to collect/store the bad/failed data in local and/or remote storage, such as local and/or remote cache(s), disk(s), or other storage(s).

The data stewards 320 can take any manual actions desired, for instance to modify (314) one or more data quality rule(s)—rule definition and/or parameters of the rule—or to update (316) cached data in-memory, as examples. The data quality engine can maintain the data while waiting a threshold amount of time for such manual action. To the extent that such actions enable the data to pass quality checking, the process will load (318) the data into the target at that point. Alternatively, the data quality engine can cancel the job and/or discard some or all of the data residing in-memory. Passed and/or failed data, to the extent stored in staging or other location, could be provided for audit information if desired.

Audit information 320 can be captured with respect to each of the aspects described above with reference to FIG. 3, for instance to capture actions performed and results of those actions in an audit table. Data quality feedback and tracking data can also be stored per dataset and per job. Data quality metrics for each dataset can be tracked and reported, with 'scorecards' being maintained using the audit information. In this regard, and as noted with respect to FIG. 2, the process can integrate the data quality repository with a data catalog that uniquely identifies source and target datasets. The data catalog stores metadata for each dataset and the data quality feedback can be uploaded into the data catalog to maintain data quality related metadata about the datasets in the catalog itself.

Accordingly, aspects described herein pertain to data extraction, transform, quality checking, and loads in data quality is implemented before loading the data to the target, while the data reside in-memory such that there is no need for an extraction between transformation and quality checking. This saves additional I/O otherwise taken to extract transformed data from disk (e.g. at the target), performing the quality checking, and writing it again. Additionally, aspects can generate alerts in situations of DQ failure and data stewards or other uses can change data quality rule(s) and/or their parameters on-the-fly, i.e. as the data, with the desired transformations partially or wholly applied, remains in-memory prior to loading to the target. Further, actions to change/modify the data in-memory can be performed manually on-the-fly.

This provides data quality checking not just for data acquisition but also in situations when the data is transformed (for example to provide data enrichment, business calculations and logic, normalize-denormalization, aggregation, etc.) while maintaining separation of concerns between the transform logic performing the transformation processing and the data quality logic performing the data quality processing. In many data pipelines, data is passed through several layers (acquisition, raw, transformed/enriched, business, analytics, etc.) with different transformation(s) applied at each layer and different data quality requirements applicable at each layer. Data quality checking in accordance with aspects discussed herein can provide such data quality checking before, in-between, and/or after any such transformations, as the data resides in-memory all prior to a load of the data, either as extracted or transformed in whole/in part, to the target.

Figure 4:
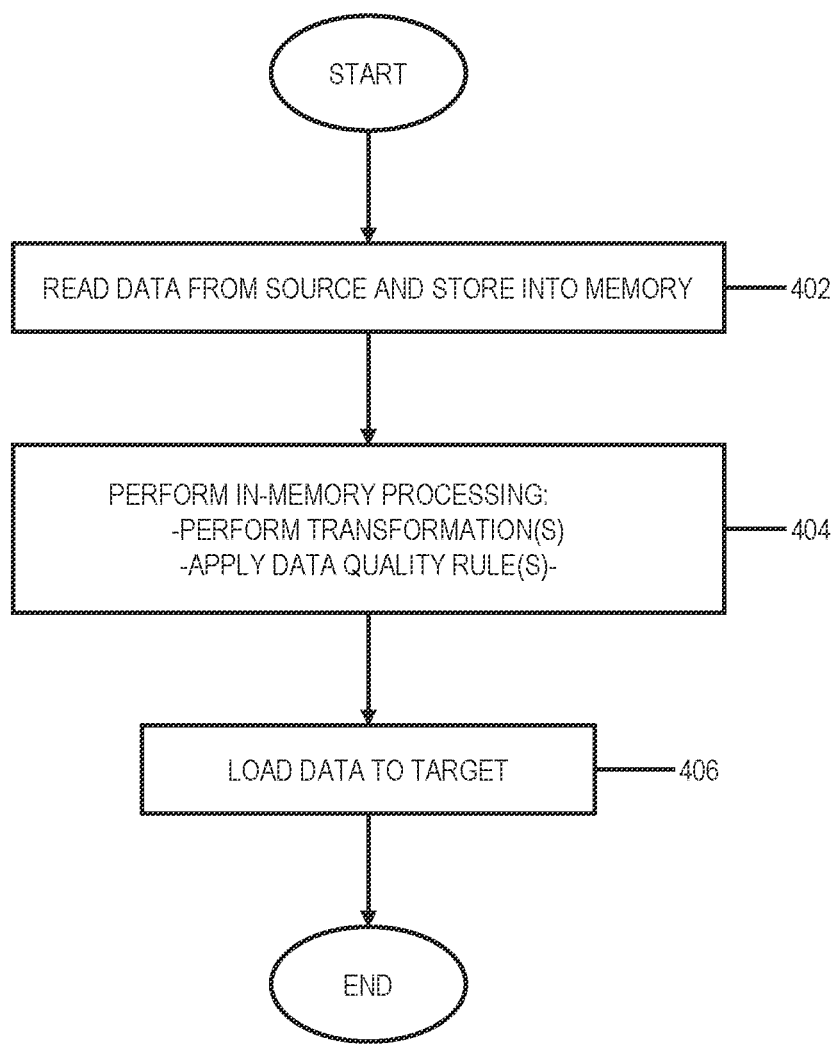
FIG. 4 depicts an example process for data transformation and quality checking, in accordance with aspects described herein.

FIG. 4 depicts an example process for data transformation and quality checking in accordance with aspects described herein. The process is performed by one or more computer systems, such as those described herein, which may include one or more computer systems in communication with source and target datastores, one or more cloud servers, and/or one or more other computer systems.

The process begins reads (402) data from a source datastore and stores the data into memory. The memory is, as an example, main memory or working memory of a computer system. In other examples the memory is an in-memory cache, which may be a local, distributed, or hybrid in-memory cache of a plurality of computer systems that may or may not include the system performing the reading and storing.

The process continues by performing (404) in-memory processing of the data stored in memory. The data is maintained in memory for performance of the in-memory processing thereof. In other words, any given data portion is maintained in memory for the entirety of the described in-memory processing on that portion of the data, and is not written-out of the memory to the target datastore until the in-memory processing (e.g. transformation(s) and data quality rule application) of that portion of data completes.

The in-memory processing includes performing one or more transformations on the data stored in memory, in which the data stored in memory is transformed and stored back into the memory, and applying one or more data quality rules to the data stored in memory. In situations when the one or more data quality rules includes a plurality of data quality rules for application to the data stored in-memory, maintaining the data in memory can include storing the read data to a local, distributed, or hybrid in-memory cache, where applying that plurality of data quality rules applies the plurality of data quality rules to the data in the in-memory cache.

In embodiments, the applying the data quality rule(s) includes applying at least one data quality rule of the data quality rule(s) to a portion of the data stored in memory prior to performing the one or more transformations. Additionally or alternatively, applying the data quality rule(s) includes applying at least one data quality rule of the data quality rules to a portion of the data stored in memory as one of the transformation(s) being performed on the portion of the data stored in memory is temporarily paused for application of the at least one data quality rule thereto. Additionally or alternatively applying the data quality rule(s) includes applying at least one data quality rule of the data quality rule(s) to a portion of the data stored in memory in between performing a transformation and a sequentially-next transformation of the transformation(s) on that portion of the data stored in memory. Additionally or alternatively, applying the data quality rule(s) includes applying at least one data quality rule of the data quality rules to a portion of the data stored in memory after performing the transformation(s) to the portion of the data stored in-memory.

The performing the transaction(s) can include executing transformation logic that performs the transformanon(s) and the applying the data quality rule(s) can include executing data quality logic that performs the applying the data quality rule(s). Such transformation logic can be maintained and provided to the in-memory processing as a first codebase while the data quality logic can be maintained and provided to the in-memory processing as a second codebase that is separate from the first codebase in terms of development and maintenance.

In some examples, provisions are made for execution to pass from the transformation logic to the data quality logic and vice-versa. Thus, performance of the in-memory processing can include directing execution of the system performing the in-memory processing from the transformation logic of the first codebase to the data quality logic of the second codebase via any desirable approach(es), for instance dependency injection to the transformation logic, hooking into the transformation logic, and/or callback(s) to the transformation logic. Depending on when the data quality rules are to be applied relative to transformation(s) being performed on the data, execution might pass between the transformation logic and data quality logic multiple times during performance of the in-memory processing. As one example, there might be data quality rule(s) to apply before one or more transformations (for instance to verify source data format) and the other data quality rule(s) to apply after the transformation, for instance to ensure that the data loaded to the target matches a required format.

Continuing with FIG. 4, based on performing the in-memory processing (404) of the data stored and maintained in memory for the in-memory processing, the process loads (406) to a target datastore at least some of the data processed by the in-memory processing. As noted above, the load of a portion of data to the target occurs after the in-memory processing has processed that data (transformed and quality checked by way of the rule(s) while it was maintained in memory for that in-memory processing.

In some embodiments, the read data is stored in memory to an in-memory cache such as a local in-memory cache, a distributed in-memory cache, and/or a hybrid in-memory cache and the in-memory processing performs the transformation(s) on the data stored in memory in the in-memory cache to produce transformed data that is stored back into the in-memory cache (e.g. as opposed to bring written out to the target datastore at that point. The performing the in-memory processing then directs execution of the in-memory processing to a data quality engine that applies the data quality rule(s) to the transformed data stored in the in-memory cache based on performance of the transformation(s), and the loading (406) is performed based on the at least some of the data passing the data quality rule(s) applied to it.

Figure 5:
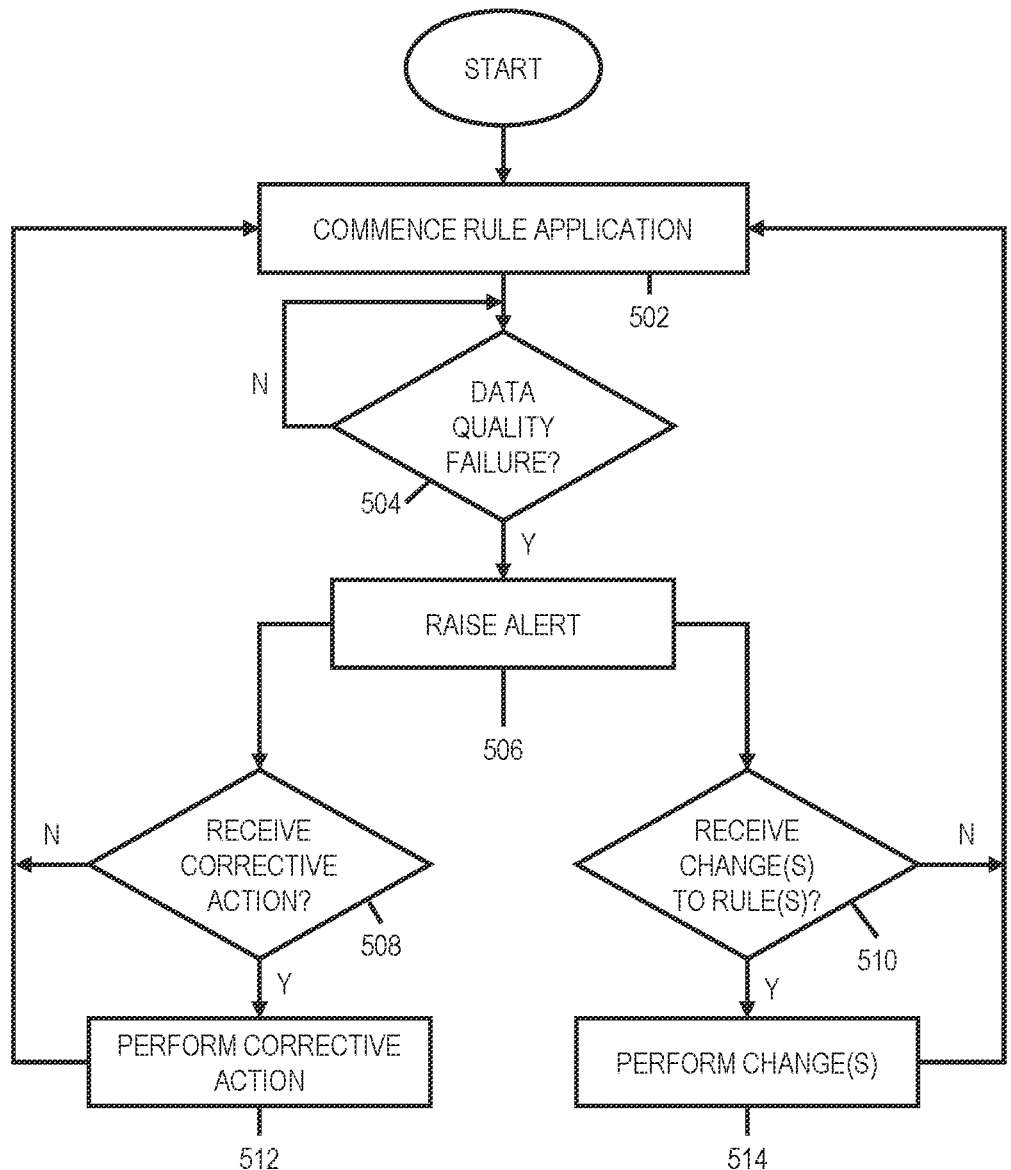
FIG. 5 depicts an example process for handling data quality failure, in accordance with aspects described herein.

FIG. 5 depicts an example process for handling data quality failure in accordance with aspects described herein. Specifically, aspects for corrections/updates to failed data and/or data quality rule(s) is provided.

The process commences (502) applying the rule(s) (i.e. as part of FIG. 4, 404). Application of rule(s) could result in pass or failure of a given data element. Failure is referred to as a data quality failure with respect to that element. The process checks (504) whether a data quality failure has occurred. If not, the process loops on this checking until all rule application has ceased (at which point a break from the process could be performed).

Otherwise, if a data quality failure has occurred (504, Y), the process raises (506) an alert to a user based on the data quality failure. The process and/or alert could indicate data that failed at least one data quality rule of the data quality rule(s) and/or the e(s) that such data filed. Optionally, the failed data could be stored to a temporary storage while the process awaits corrective action from the user with respect to correction action(s) to apply to the failed data and/or change(s) to me made to data quality rule(s). In some examples, there is a predefined threshold amount of time by which a user is to provide such actions, otherwise aspects of the in-memory processing could reflect a failure, for instance failure of the in-memory processing job altogether.

In any case, after raising the alert, the process determines (508) whether it receives (optionally within ay applicable threshold amount of time) from the user, in response to the alert, an indication of a corrective action to perform on the failed data as it is maintained in-memory. If so, (508, Y), the process performs (512) the corrective action on the failed data to provide corrected data in-memory. The loading (FIG. 4, 406) could load to the target datastore that corrected data.

Also after raising the alert, the process determines (510) whether it receives (optionally within ay applicable threshold amount of time) from the user an indication of changes to perform against the one or more data quality rules. If so, (510, Y), the process performs (514) the changes to the one or more data quality rules. Performing the changes produces a changed one or more data quality rules, and applying the one or more data quality rules (i.e. as part of FIG. 4, 404) applies the changed one or more data quality rules to a portion of the data stored in-memory.

In examples, the changes include (i) a change to an existing data quality rule (rule definition and/or attribute(s) of the rule) of the one or more data quality rules, where performing the changes (514) performs the change to the existing data quality rule and the applying applies the changed existing data quality rule to the portion of the data stored in memory, (ii) disablement of an existing data quality rule of the one or more data quality rules, where performing the changes (514) disables the existing data quality rule and the applying skips application of the disabled existing data quality rule to the portion of the data stored in memory, and/or (iii) addition of a new data quality rule to the one or more data quality rules, where the performing the changes (514) adds the new data quality rule to the one or more data quality rules and the applying applies the new data quality rule to the portion of the data stored in memory.

After performing corrective action(s) and/or performing the change(s) to the rule(s), or if the process does not receive an indication of corrective action(s) (508, N) and does not receive change(s) to perform against the data quality rule(s) (510, N), the process returns to 502 to re-commence the rule(s) application.

Although various examples are provided, variations are possible without departing from a spirit of the claimed aspects.

Figure 6:
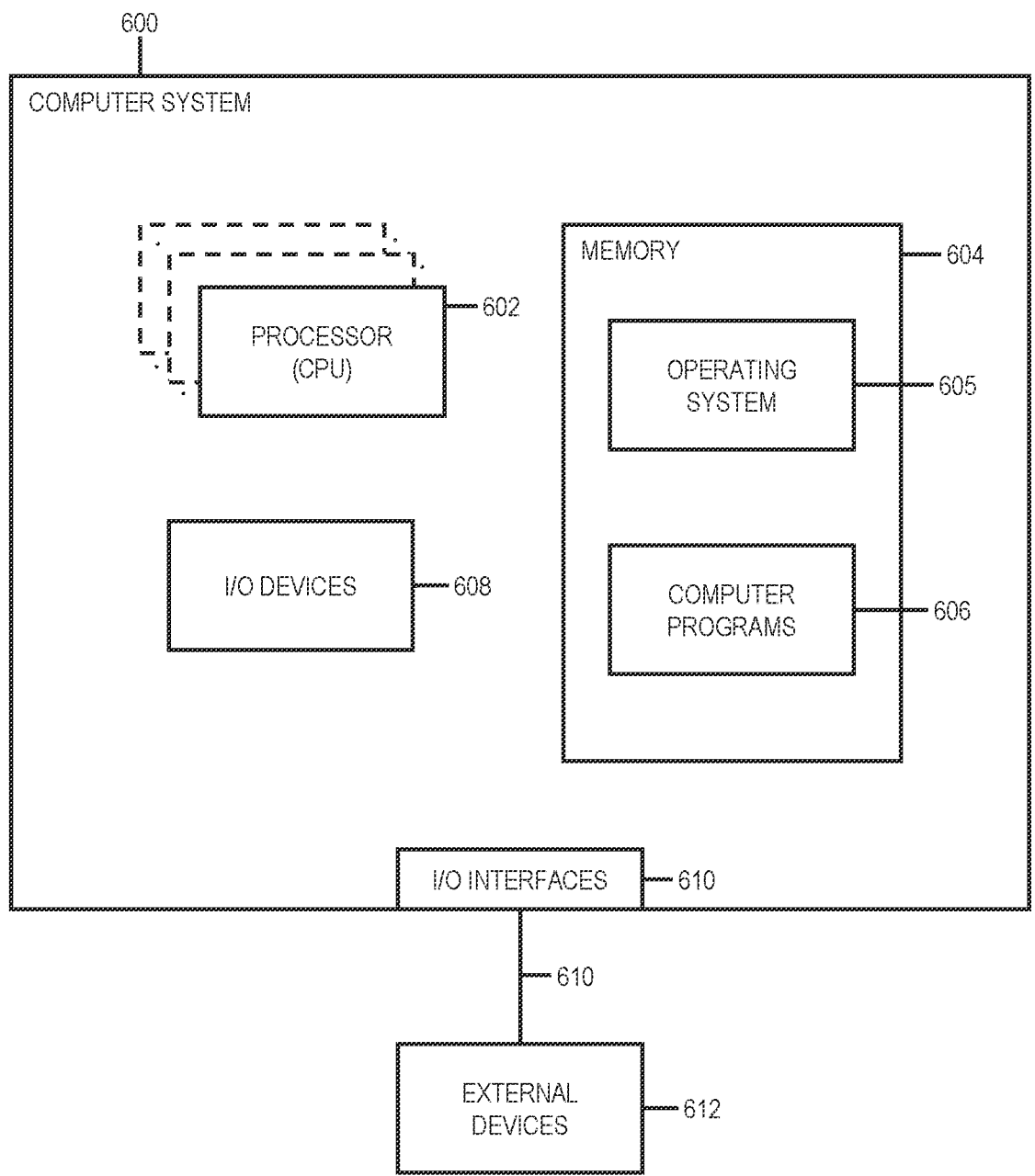
FIG. 6 depicts one example of a computer system and associated devices to incorporate and/or use aspects described herein.

Processes described herein may be performed singly or collectively by one or more computer systems. FIG. 6 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by International Business Machines Corporation (Armonk, New York, USA), Intel Corporation (Santa Clara, California, USA) or ARM Holdings plc (Cambridge, England, United Kingdom), as examples.

FIG. 6 shows a computer system 600 in communication with external device(s) 612. Computer system 600 includes one or more processor(s) 602, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 602 can also include register(s) to be used by one or more of the functional components. Computer system 600 also includes memory 604, input/output (I/O) devices 608, and I/O interfaces 610, which may be coupled to processor(s) 602 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 604 can be or include main or system memory (e.g. Random Access Memory) used in the execution of program instructions, storage device(s) such as hard drive(s), flash media, or optical media as examples, and/or cache memory, as examples. Memory 604 can include, for instance, a cache, such as a shared cache, which may be coupled to local caches (examples include L1 cache, L2 cache, etc.) of processor(s) 602. Additionally, memory 604 may be or include at least one computer program product having a set (e.g., at least one) of program modules, instructions, code or the like that is/are configured to carry out functions of embodiments described herein when executed by one or more processors.

Memory 604 can store an operating system 605 and other computer programs 606, such as one or more computer programs/applications that execute to perform aspects described herein. Specifically, programs/applications can include computer readable program instructions that may be configured to carry out functions of embodiments of aspects described herein.

Examples of I/O devices 608 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (612) coupled to the computer system through one or more I/O interfaces 610.

Computer system 600 may communicate with one or more external devices 612 via one or more I/O interfaces 610. Example external devices include a keyboard, a pointing device, a display, and/or any other devices that enable a user to interact with computer system 600. Other example external devices include any device that enables computer system 600 to communicate with one or more other computing systems or peripheral devices such as a printer. A network interface/adapter is an example I/O interface that enables computer system 600 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Washington, U.S.A.).

The communication between I/O interfaces 610 and external devices 612 can occur across wired and/or wireless communications link(s) 611, such as Ethernet-based wired or wireless connections. Example wireless connections include cellular, Wi-Fi, Bluetooth®, proximity-based, near-field, or other types of wireless connections. More generally, communications link(s) 611 may be any appropriate wireless and/or wired communication link(s) for communicating data.

Particular external device(s) 612 may include one or more data storage devices, which may store one or more programs, one or more computer readable program instructions, and/or data, etc. Computer system 600 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 600 may be operational with numerous other general purpose or special purpose computing system environments or configurations. Computer system 600 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
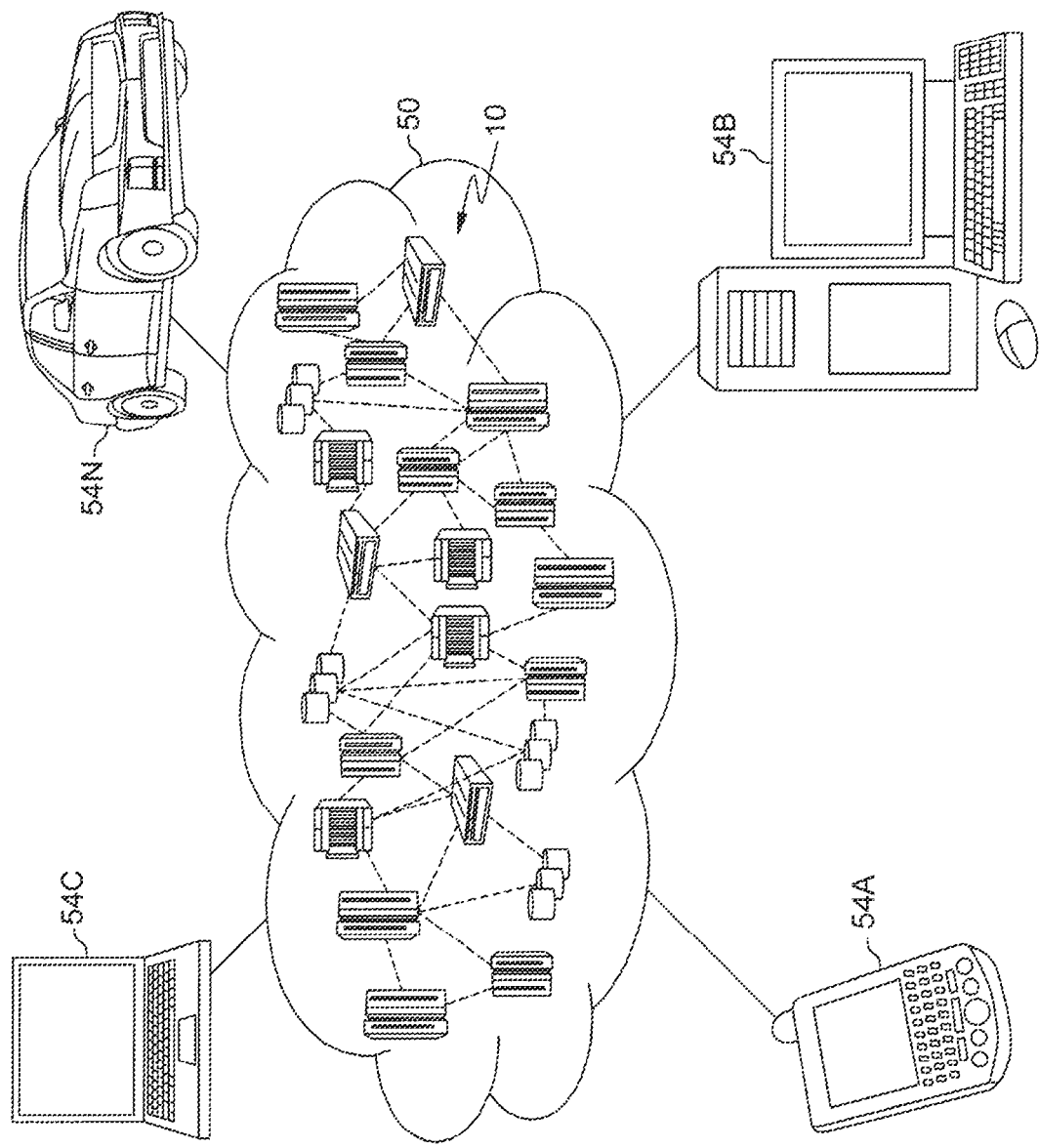
FIG. 7 depicts a cloud computing environment according to an embodiment of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
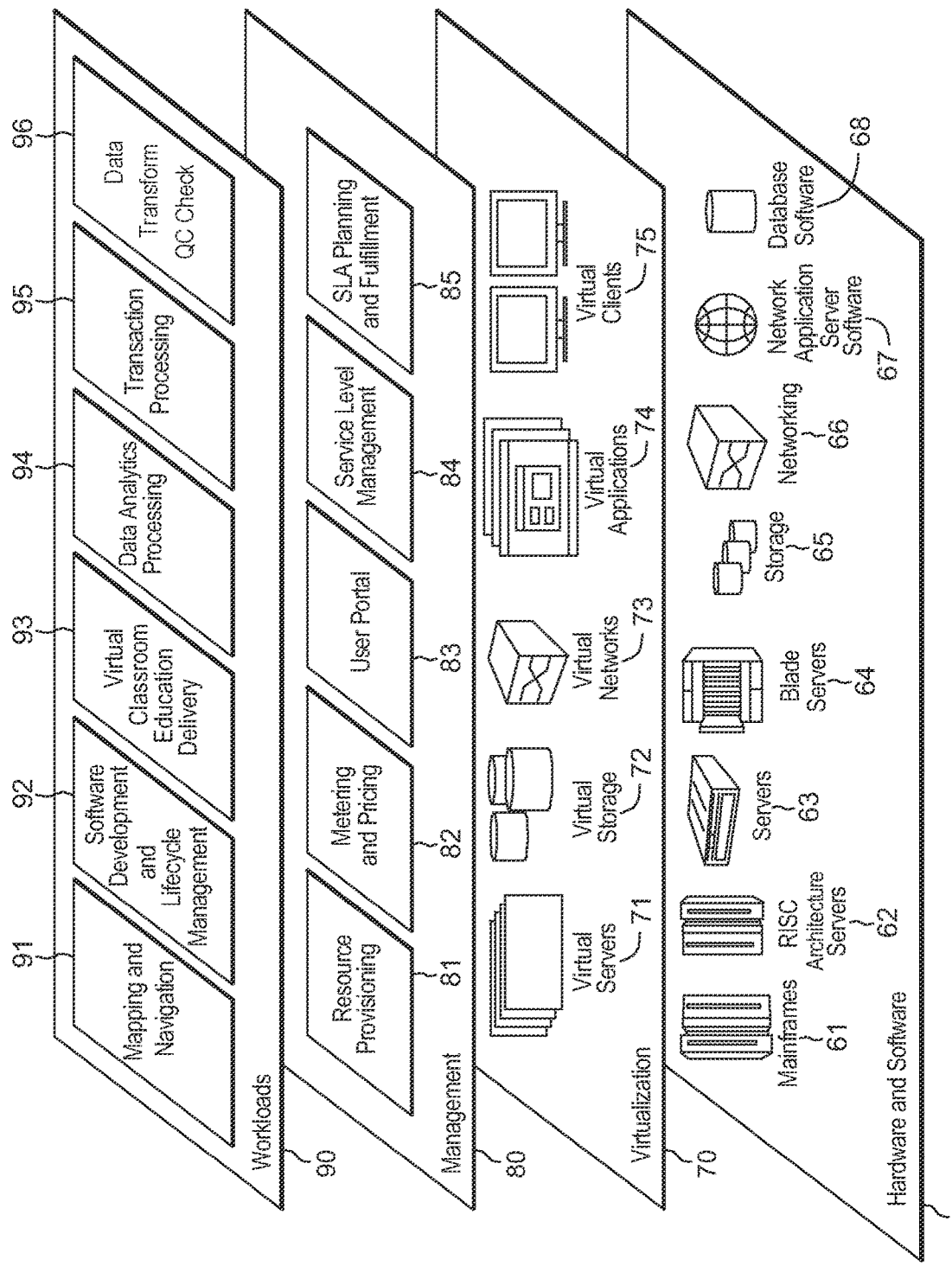
FIG. 8 depicts abstraction model layers according to an embodiment of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data transform and quality checking (QC) 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
reading data from a source datastore of a source system of a source site, and storing the data read from the source datastore into memory, the memory comprising an in-memory cache into which the data is stored, wherein the data read from the source datastore is to be transformed, quality-checked, and then loaded to a target datastore, different from the source datastore, of a target system different from the source system;
performing in-memory processing of the data read from the source datastore and stored in the memory, wherein the data is maintained in the memory for performance of the in-memory processing thereof, and wherein the in-memory processing comprises:
performing one or more transformations on the data stored in the memory, in which the data stored in the memory is transformed and stored back into the memory; and
applying one or more data quality rules to the data stored in the memory, wherein the applying the one or more data quality rules comprises at least one selected from a group consisting of: (i) applying at least one data quality rule of the one or more data quality rules to a portion of the data stored in the memory prior to performing the one or more transformations, (ii) applying at least one data quality rule of the one or more data quality rules to a portion of the data stored in the memory as a transformation, of the one or more transformations, being performed on the portion of the data stored in the memory is temporarily paused for application of the at least one data quality rule thereto, (iii) applying at least one data quality rule of the one or more data quality rules to a portion of the data stored in the memory in between performing a transformation and a sequentially-next transformation of the one or more transformations on the portion of the data stored in the memory, and (iv) applying at least one data quality rule of the one or more data quality rules to a portion of the data stored in the memory after performing the one or more transformations to the portion of the data stored in the memory; and
based on performing the in-memory processing of the data stored and maintained in the memory for the in-memory processing, loading to the target datastore at least some of the data processed by the in-memory processing, wherein the source system and target system are remote from each other with the source system being of the source site and the target system being of a target site that is different from the source site.

2. The method of claim 1, wherein the one or more data quality rules comprise a plurality of data quality rules for application to the data stored in the memory, and wherein the in-memory cache is selected as at least one from a group consisting of: a local in-memory cache, a distributed in-memory cache, and a hybrid in-memory cache, wherein the applying the plurality of data quality rules applies the plurality of data quality rules to the data in the in-memory cache.

3. The method of claim 1, wherein performing the one or more transformations comprises executing transformation logic that performs the one or more transformations, wherein applying the one or more data quality rules comprises executing data quality logic that performs the applying the one or more data quality rules, wherein the transformation logic is maintained and provided to the in-memory processing as a first codebase and the data quality logic is maintained and provided to the in-memory processing as a second codebase separate from the first codebase.

4. The method of claim 3, wherein performance of the in-memory processing further comprises directing execution from the transformation logic of the first codebase to the data quality logic of the second codebase via at least one selected from a group consisting of: a dependency injection to the transformation logic, a hook into the transformation logic, or a callback to the transformation logic.

5. The method of claim 1, wherein the performing in-memory processing further comprises:
raising an alert to a user based on a data quality failure, and indicating data that failed at least one data quality rule of the one or more data quality rules;
storing the failed data to a temporary storage and awaiting corrective action from the user to be provided within a predefined threshold amount of time;
receiving from the user, in response to the alert, an indication of a corrective action to perform on the failed data as it is maintained in the memory; and
performing the corrective action on the failed data to provide corrected data in-memory, wherein the loading comprises loading to the target datastore the corrected data.

6. The method of claim 1, wherein the performing in-memory processing further comprises:
raising an alert to a user based on data quality failure, the data quality failure resulting from commencing the applying of the one or more data quality rules;
receiving from the user an indication of changes to perform against the one or more data quality rules; and
performing the changes to the one or more data quality rules, the performing the changes producing a changed one or more data quality rules, wherein the applying the one or more data quality rules applies the changed one or more data quality rules to a portion of the data stored in the memory.

7. The method of claim 6, wherein the changes comprise at least one selected from a group consisting of: (i) a change to an existing data quality rule of the one or more data quality rules, wherein performing the changes performs the change to the existing data quality rule and the applying applies the changed existing data quality rule to the portion of the data stored in the memory, (ii) disablement of an existing data quality rule of the one or more data quality rules, wherein performing the changes disables the existing data quality rule and wherein the applying skips application of the disabled existing data quality rule to the portion of the data stored in the memory, and (iii) addition of a new data quality rule to the one or more data quality rules, wherein the performing the changes adds the new data quality rule to the one or more data quality rules and wherein the applying applies the new data quality rule to the portion of the data stored in the memory.

8. The method of claim 1, wherein the in-memory cache is selected as at least one from a group consisting of: a local in-memory cache, a distributed in-memory cache, and a hybrid in-memory cache, and wherein the in-memory processing performs the one or more transformations on the data stored in the memory in the in-memory cache to produce transformed data that is stored back into the in-memory cache, and directs execution of the in-memory processing to a data quality engine, the data quality engine applying the one or more data quality rules to the transformed data stored in the in-memory cache based on performance of the one or more transformations, and wherein the loading is performed based on the at least some of the data passing the one or more data quality rules.

9. The method of claim 1, further comprising generating, using a machine learning model and catalogue information about at least one selected from a group consisting of the source dataset and the target dataset, configuration recommendations about at least one data quality rule of the one or more data quality rules and providing the configuration recommendations to a user configuring the at least one data quality rule.

10. A computer system comprising:
at least one computer readable storage medium; and
a processor in communication with the at least one computer readable storage medium, wherein the computer system is configured to perform a method comprising:
reading data from a source datastore of a source system of a source site, and storing the data read from the source datastore into memory, the memory comprising an in-memory cache into which the data is stored, wherein the data read from the source datastore is to be transformed, quality-checked, and then loaded to a target datastore, different from the source datastore, of a target system different from the source system;
performing in-memory processing of the data read from the source datastore and stored in the memory, wherein the data is maintained in the memory for performance of the in-memory processing thereof, and wherein the in-memory processing comprises:
performing one or more transformations on the data stored in the memory, in which the data stored in the memory is transformed and stored back into the memory; and
applying one or more data quality rules to the data stored in the memory, wherein the applying the one or more data quality rules comprises at least one selected from a group consisting of: (i) applying at least one data quality rule of the one or more data quality rules to a portion of the data stored in the memory prior to performing the one or more transformations, (ii) applying at least one data quality rule of the one or more data quality rules to a portion of the data stored in the memory as a transformation, of the one or more transformations, being performed on the portion of the data stored in the memory is temporarily paused for application of the at least one data quality rule thereto, (iii) applying at least one data quality role of the one or more data quality rules to a portion of the data stored in the memory in between performing a transformation and a sequentially-next transformation of the one or more transformations on the portion of the data stored in the memory, and (iv) applying at least one data quality rule of the one or more data quality rules to a portion of the data stored in the memory after performing the one or more transformations to the portion of the data stored in the memory; and
based on performing the in-memory processing of the data stored and maintained in the memory for the in-memory processing, loading to the target datastore at least some of the data processed by the in-memory processing, wherein the source system and target system are remote from each other with the source system being of the source site and the target system being of a target site that is different from the source site.

11. The computer system of claim 10, wherein performing the one or more transformations comprises executing transformation logic that performs the one or more transformations, wherein applying the one or more data quality rules comprises executing data quality logic that performs the applying the one or more data quality rules, wherein the transformation logic is maintained and provided to the in-memory processing as a first codebase and the data quality logic is maintained and provided to the in-memory processing as a second codebase separate from the first codebase, and wherein performance of the in-memory processing further comprises directing execution from the transformation logic of the first codebase to the data quality logic of the second codebase via at least one selected from a group consisting of: a dependency injection to the transformation logic, a hook into the transformation logic, or a callback to the transformation logic.

12. The computer system of claim 10, wherein the performing in-memory processing further comprises:
raising an alert to a user based on a data quality failure, and indicating data that failed at least one data quality rule of the one or more data quality rules;
storing the failed data to a temporary storage and awaiting corrective action from the user to be provided within a predefined threshold amount of time;
receiving from the user, in response to the alert, an indication of a corrective action to perform on the failed data as it is maintained in the memory; and
performing the corrective action on the failed data to provide corrected data in-memory, wherein the loading comprises loading to the target datastore the corrected data.

13. The computer system of claim 10, wherein the performing in-memory processing further comprises:
raising an alert to a user based on data quality failure, the data quality failure resulting from commencing the applying of the one or more data quality rules;
receiving from the user an indication of changes to perform against the one or more data quality rules; and
performing the changes to the one or more data quality rules, the performing the changes producing a changed one or more data quality rules, wherein the applying the one or more data quality rules applies the changed one or more data quality rules to a portion of the data stored in the memory.

14. The computer system of claim 10, wherein the in-memory cache is selected as at least one from a group consisting of: a local in-memory cache, a distributed in-memory cache, and a hybrid in-memory cache, and wherein the in-memory processing performs the one or more transformations on the data stored in the memory in the in-memory cache to produce transformed data that is stored back into the in-memory cache, and directs execution of the in-memory processing to a data quality engine, the data quality engine applying the one or more data quality rules to the transformed data stored in the in-memory cache based on performance of the one or more transformations, and wherein the loading is performed based on the at least some of the data passing the one or more data quality rules.

15. A computer program product comprising:
a computer readable storage medium readable by a processing circuit and storing instructions for execution by the processing circuit for performing a method comprising:
reading data from a source datastore of a source system of a source site, and storing the data read from the source datastore into memory, the memory comprising an in-memory cache into which the data is stored, wherein the data read from the source datastore is to be transformed, quality-checked, and then loaded to a target datastore, different from the source datastore, of a target system different from the source system;
performing in-memory processing of the data read from the source datastore and stored in the memory, wherein the data is maintained in the memory for performance of the in-memory processing thereof, and wherein the in-memory processing comprises:
performing one or more transformations on the data stored in the memory, in which the data stored in the memory is transformed and stored back into the memory; and
applying one or more data quality rules to the data stored in the memory, wherein the applying the one or more data quality rules comprises at least one selected from a group consisting of: (i) applying at least one data quality rule of the one or more data quality rules to a portion of the data stored in the memory prior to performing the one or more transformations, (ii) applying at least one data quality rule of the one or more data quality rules to a portion of the data stored in the memory as a transformation, of the one or more transformations, being performed on the portion of the data stored in the memory is temporarily paused for application of the at least one data quality rule thereto, (iii) applying at least one data quality role of the one or more data quality rules to a portion of the data stored in the memory in between performing a transformation and a sequentially-next transformation of the one or more transformations on the portion of the data stored in the memory, and (iv) applying at least one data quality rule of the one or more data quality rules to a portion of the data stored in the memory after performing the one or more transformations to the portion of the data stored in the memory; and
based on performing the in-memory processing of the data stored and maintained in the memory for the in-memory processing, loading to the target datastore at least some of the data processed by the in-memory processing, wherein the source system and target system are remote from each other with the source system being of the source site and the target system being of a target site that is different from the source site.

16. The computer program product of claim 15, wherein performing the one or more transformations comprises executing transformation logic that performs the one or more transformations, wherein applying the one or more data quality rules comprises executing data quality logic that performs the applying the one or more data quality rules, wherein the transformation logic is maintained and provided to the in-memory processing as a first codebase and the data quality logic is maintained and provided to the in-memory processing as a second codebase separate from the first codebase, and wherein performance of the in-memory processing further comprises directing execution from the transformation logic of the first codebase to the data quality logic of the second codebase via at least one selected from a group consisting of: a dependency injection to the transformation logic, a hook into the transformation logic, or a callback to the transformation logic.

17. The computer program product of claim 15, wherein the performing in-memory processing further comprises:
raising an alert to a user based on a data quality failure, and indicating data that failed at least one data quality rule of the one or more data quality rules;
storing the failed data to a temporary storage and awaiting corrective action from the user to be provided within a predefined threshold amount of time;
receiving from the user, in response to the alert, an indication of a corrective action to perform on the failed data as it is maintained in the memory; and
performing the corrective action on the failed data to provide corrected data in-memory, wherein the loading comprises loading to the target datastore the corrected data.

18. The computer program product of claim 15, wherein the performing in-memory processing further comprises:
raising an alert to a user based on data quality failure, the data quality failure resulting from commencing the applying of the one or more data quality rules;
receiving from the user an indication of changes to perform against the one or more data quality rules; and
performing the changes to the one or more data quality rules, the performing the changes producing a changed one or more data quality rules, wherein the applying the one or more data quality rules applies the changed one or more data quality rules to a portion of the data stored in the memory.

19. The computer program product of claim 15, wherein the in-memory cache is selected as at least one from a group consisting of: a local in-memory cache, a distributed in-memory cache, and a hybrid in-memory cache, and wherein the in-memory processing performs the one or more transformations on the data stored in the memory in the in-memory cache to produce transformed data that is stored back into the in-memory cache, and directs execution of the in-memory processing to a data quality engine, the data quality engine applying the one or more data quality rules to the transformed data stored in the in-memory cache based on performance of the one or more transformations, and wherein the loading is performed based on the at least some of the data passing the one or more data quality rules.

* * * * *